US008972523B2

(12) United States Patent
Lee et al.

(10) Patent No.: US 8,972,523 B2
(45) Date of Patent: Mar. 3, 2015

(54) ADAPTIVE LOCALIZED CONTENT STORAGE AND DISTRIBUTION

(75) Inventors: Jay J. Lee, San Ramon, CA (US); David Chiang, Fremont, CA (US); Patricia Ruey-Jane Chang, San Ramon, CA (US); Lalit R. Kotecha, San Ramon, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 60 days.

(21) Appl. No.: 13/423,562

(22) Filed: Mar. 19, 2012

(65) Prior Publication Data

US 2013/0246564 A1 Sep. 19, 2013

(51) Int. Cl.
  *G06F 15/16* (2006.01)
  *H04L 29/08* (2006.01)
  *H04L 29/06* (2006.01)

(52) U.S. Cl.
  CPC ....... *H04L 29/0854* (2013.01); *H04L 29/08702* (2013.01); *H04L 63/10* (2013.01)
  USPC ...................................................... 709/217

(58) Field of Classification Search
  None
  See application file for complete search history.

(56) References Cited

U.S. PATENT DOCUMENTS

| 7,756,130 | B1* | 7/2010 | Lee et al. | 370/389 |
|---|---|---|---|---|
| 2005/0262251 | A1* | 11/2005 | Klemets et al. | 709/230 |
| 2008/0034393 | A1* | 2/2008 | Crayford | 725/87 |
| 2009/0040983 | A1* | 2/2009 | Kim et al. | 370/331 |
| 2010/0036954 | A1* | 2/2010 | Sakata et al. | 709/226 |
| 2013/0041932 | A1* | 2/2013 | Moore et al. | 709/203 |
| 2013/0041943 | A1* | 2/2013 | Ozawa | 709/203 |
| 2013/0132544 | A1* | 5/2013 | Krishnan et al. | 709/223 |
| 2013/0144979 | A1* | 6/2013 | Kansal et al. | 709/219 |
| 2013/0188598 | A1* | 7/2013 | Zakrzewski et al. | 370/331 |
| 2014/0019578 | A1* | 1/2014 | Lim et al. | 709/213 |
| 2014/0146669 | A1* | 5/2014 | Ozawa | 370/230 |
| 2014/0219179 | A1* | 8/2014 | Zakrzewski | 370/328 |
| 2014/0286165 | A1* | 9/2014 | Chowdhury et al. | 370/235 |

FOREIGN PATENT DOCUMENTS

WO    WO 2008011549 A2 *  1/2008

* cited by examiner

*Primary Examiner* — Farid Homayounmehr
*Assistant Examiner* — Olanrewaju Bucknor

(57) ABSTRACT

A device receives, from a user device and via a first device, a first request for content, and determines whether the content is stored in memory. The device identifies first other requests for the content, received via the first device over a time period, and second other requests for the content, received via a second device over the time period, when the content is stored in the memory. The device identifies a first quantity of the first other requests and a second quantity of the second other requests, and determines whether the first quantity or the second quantity is greater than a threshold. The device transmits the content, to the user device and via the first device, when the first quantity is not greater than the threshold, and transmits, to the second device, an instruction to store the content when the second quantity is greater than the threshold.

21 Claims, 10 Drawing Sheets

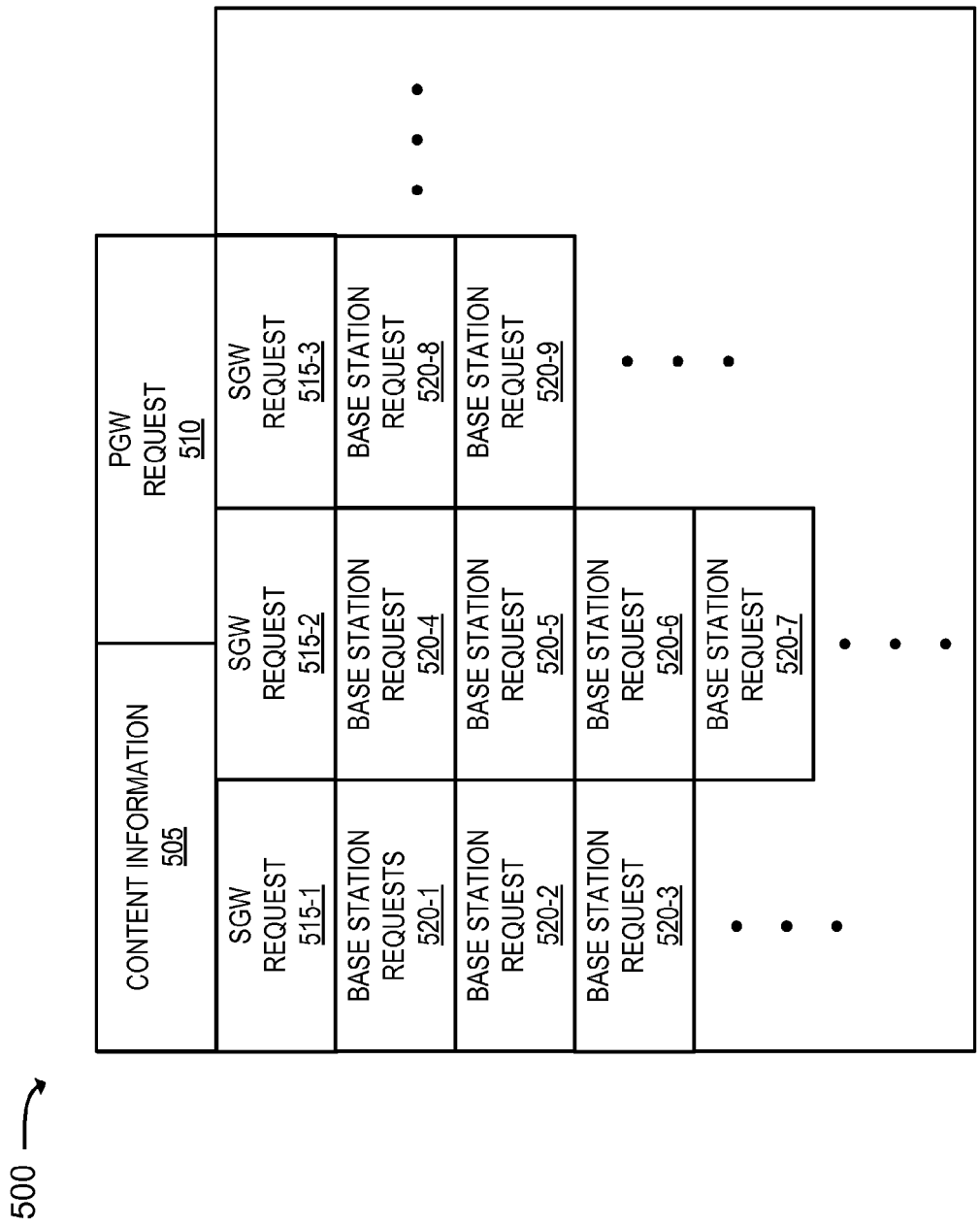

ADAPTIVE LOCALIZED CONTENT STORAGE AND DISTRIBUTION

BACKGROUND

User devices perform an increasing variety of tasks that allow users to make and receive calls, send and receive messages (e.g., emails, instant messages, etc.), access and interact with the Internet, download and play audio and/or video content, make electronic purchases, communicate via social networking, etc. The user devices may communicate with content providers to obtain content, such as data, audio, and/ or video, to be downloaded or streamed to the user devices. The content providers may provide, to the user devices, the content via a network to which users of the user devices have subscribed.

BRIEF DESCRIPTION OF THE DRAWINGS

FIG. 5 is a diagram of an example data structure that may store information associated with requests, for content, being processed by devices associated with a network;

DETAILED DESCRIPTION OF PREFERRED EMBODIMENTS

The following detailed description refers to the accompanying drawings. The same reference numbers in different drawings may identify the same or similar elements.

Systems and/or methods, described herein, may enable a network device to temporarily store particular content, received from a content provider, for provisioning to one or more user devices. The network device may temporarily store the particular content when a quantity of user devices, requesting the particular content, is greater than a threshold level. The network device may, in response to a request for the particular content from a user device, retrieve the particular content that has been temporarily stored. The network device may provide, to the user device, the particular content in a format that is supported by the user device and/or in a manner for which a user of the user device has subscribed.

The systems and/or methods may enable the content provider to cause particular content to be temporarily stored in the network device that distributes content to one or more user devices. When the content provider determines that a quantity of requests for the particular content, received via the network device, is greater than the threshold level, the content provider may instruct the network device to temporarily store the particular content. The content provider may transmit the particular content, to other network device, in formats that are supported by different types of user devices. Temporarily storing the particular content in the network device may decrease network resource utilization by reducing a quantity of requests, associated with the particular content, between the network device and the content provider.

Figure 1:
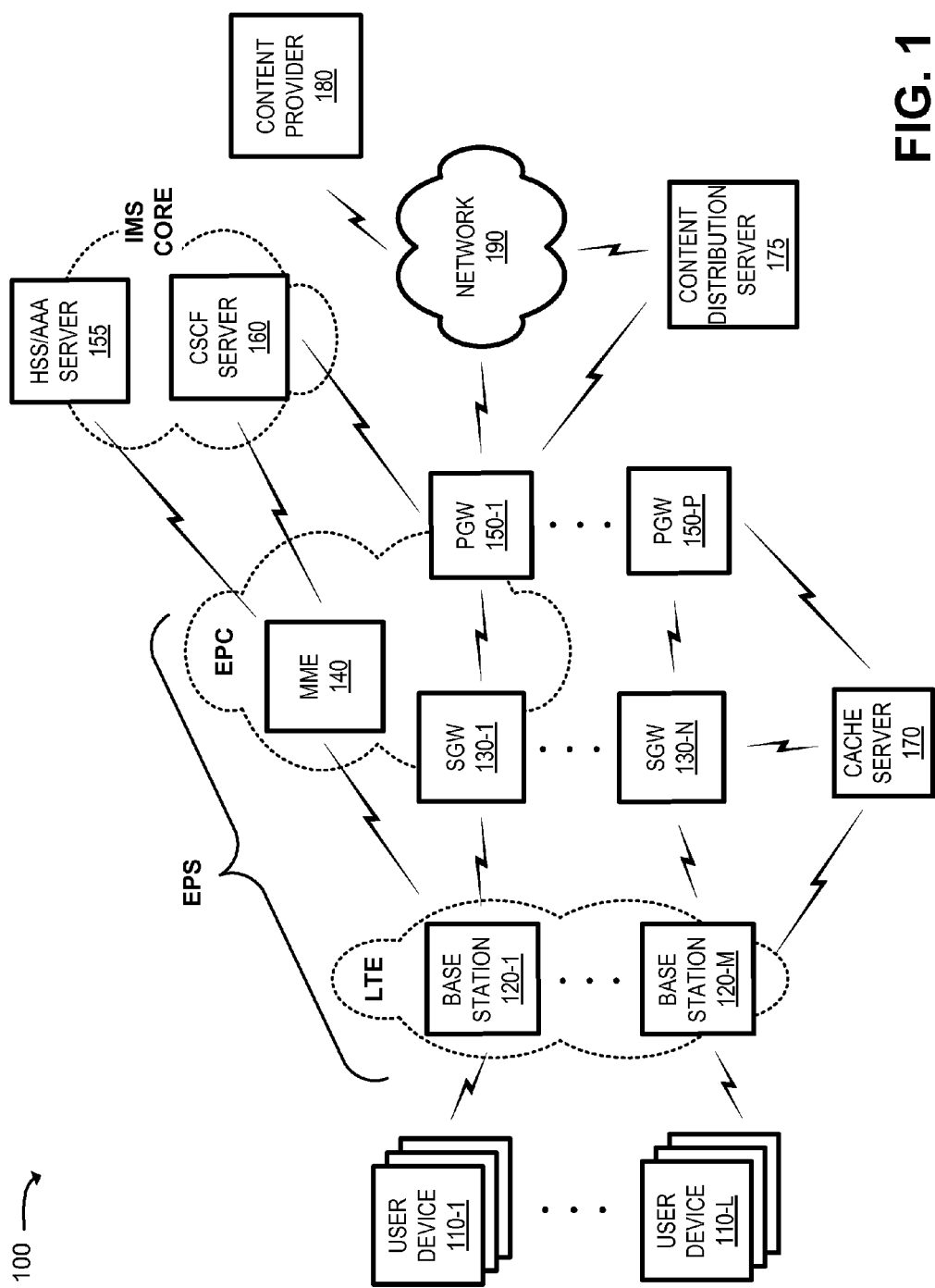
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a group of user devices 110-1, . . . , 110-L (where L≥1) (hereinafter referred to collectively as "user devices 110" and individually as "user device 110"); a group of base stations 120-1, . . . , 120-M (where M≥1) (hereinafter referred to collectively as "base stations 120" and individually as "base station 120"); a group of serving gateways 130-1, . . . 130-N (where N≥1) (hereinafter referred to collectively as "SGWs 130" and individually as "SGW 130"); a mobility management entity device 140 (hereinafter referred to as "MME 140"); a group of packet data network (PDN) gateways (PGW) 150-1, . . . , 150-P (where P≥1) (hereinafter referred to collectively as "PGWs 150" and individually as "PGW 150"); a home subscriber server (HSS)/authentication, authorization, accounting (AAA) server 155 (hereinafter referred to as an "HSS/AAA server 155"); a call session control function (CSCF) server 160 (hereinafter referred to as "CSCF server 160"); a cache server 170; a content distribution server (CDS) 175; a content provider 180; and a network 190.

The quantity of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1. Also, in some implementations, one or more of the devices of environment 100 may perform one or more functions described as being performed by another one or more of the devices of environment 100. Devices of environment 100 may interconnect via wired connections, wireless connections, or a combination of wired and wireless connections.

Environment 100 may include an evolved packet system (EPS) that includes a long term evolution (LTE) network and/or an evolved packet core (EPC) network that operate based on a third generation partnership project (3GPP) wireless communication standard. The LTE network may be a radio access network (RAN) that includes one or more base stations 120, some or all of which, take the form of an eNodeB (eNB) via which user devices 110 communicate with the EPC network. The EPC network may include the group of SGWs 130, MME 140, and/or the group of PGWs 150, and may enables user devices 110 to communicate with network 190 and/or an Internet protocol (IP) multimedia subsystem (IMS) core network. The IMS core network may include HSS/AAA server 155 and/or CSCF server 160, and may manage authentication, session initiation, account information, a user profile, etc. associated with user devices 110.

User device 110 may include any computation and communication device, such as a wireless mobile communication device that is capable of communicating with base station 120 and/or a network (e.g., network 190). For example, user device 110 may include a radiotelephone; a personal communications system (PCS) terminal (e.g., that may combine a cellular radiotelephone with data processing and data communications capabilities); a personal digital assistant (PDA) (e.g., that can include a radiotelephone, a pager, Internet/ intranet access, etc.); a smart phone; a laptop computer; a tablet computer; a camera; a personal gaming system, or another type of mobile computation and communication device. User device 110 may send traffic to and/or receive traffic from network 190.

Base station 120 may include one or more network devices that receive, process, and/or transmit traffic, such as audio, video, text, and/or other data, destined for and/or received from user device 110. In an example implementation, base station 120 may be an eNB device and may be part of the LTE network. Base station 120 may receive traffic from and/or send traffic to network 190 via SGW 130 and PGW 150. Base station 120 may send traffic to and/or receive traffic from user device 110 via an air interface. Base station 120 may temporarily store content, such as audio, video, text, and/or other data, that is received from content provider 180 via SGW 130 and/or PGW 150. Base station 120 may provide the content to user device 110 in a format supported by user device 110 and/or at a quality of service (QoS) to which a user of user device 110 has subscribed.

SGW 130 may include one or more network devices that gather, process, search, store, and/or provide information in a manner described herein. SGW 130 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 130 may, for example, aggregate traffic received from one or more base stations 120 and may send the aggregated traffic to network 190 via PGW 150.

SGW 130 may also receive traffic, such as content, from PGW 150 and/or cache server 170, and may send the received content to user device 110 via base station 120. SGW 130 may provide the content, to user device 110 and via base station 120, in a format supported by user device 110 and/or at a QoS to which a user of user device 110 has subscribed.

MME 140 may include one or more computation and communication devices that gather, process, search, store, and/or provide information in a manner described herein. For example, MME 140 may perform operations associated with a handoff to and/or from the EPS. MME 140 may perform operations to register user device 110 with the EPS, to handoff user device 110 from the EPS to another network, to handoff a user device 110 from the other network to the EPS, and/or to perform other operations. MME 140 may perform policing operations on traffic destined for and/or received from user device 110.

PGW 150 may include one or more network devices that gather, process, search, store, and/or provide information in a manner described herein. PGW 150 may include one or more data processing and/or traffic transfer devices, such as a gateway, a router, a modem, a switch, a firewall, a NIC, a hub, a bridge, a proxy server, an OADM, or some other type of device that processes and/or transfers traffic. PGW 150 may aggregate traffic received from one or more SGWs 130, etc. and may send the aggregated traffic to network 190.

PGW 150 may also, or alternatively, receive traffic, such as content, from network 190, cache server 170, and/or CDS 175 and may send the content toward user device 110 via SGW 130 and/or base station 120. PGW 150 may provide the content, to user device 110 and via SGW 130 and/or base station 120, in a format supported by user device 110 and/or at a QoS to which a user of user device 110 has subscribed.

HSS/AAA server 155 may include one or more server devices, or other types of devices, that gather, process, search, store, and/or provide information in a manner described herein. For example, HSS/AAA server 155 may manage, update, and/or store, in a memory associated with HSS/AAA server 155, profile information associated with user device 110 that identifies applications and/or services that are permitted for and/or accessible by user device 110; bandwidth or data rate thresholds associated with the applications or services; information associated with a user of user device 110 (e.g., a username, a password, a personal identification number (PIN), etc.); rate information; minutes allowed; and/or other information. Additionally, or alternatively, HSS/AAA server 155 may perform authentication, authorization, and/or accounting (AAA) operations associated with a communication session with user device 110.

CSCF server 160 may include one or more server devices, or other types of devices, that gather, process, search, store, and/or provide information in a manner described herein. CSCF server 160 may process and/or route calls to and from user device 110 via the EPC network. For example, CSCF server 160 may process calls, received from network 190, that are destined for user device 110. Alternatively, or additionally, CSCF server 160 may process calls, received from user device 110, that are destined for network 190.

Cache server 170 may include one or more server devices, or other types of devices, that gather, process, search, store, and/or provide information in a manner described herein. Cache server 170 may, for example, temporarily store content received from content provider 180. Cache server 170 may monitor requests for content, received from user devices 110, that are being processed by base station 120, SGW 130, and/or PGW 150. Cache server 170 may identify a quantity of the requests and may temporarily store the content when the quantity of requests is greater than a threshold level. In one implementation, cache server 170 may be associated with base station 120, SGW 130, and/or PGW 150. Alternatively, or additionally, a respective cache server 170 may be associated with each of base station 120, SGW 130, and/or PGW 150.

Cache server 170 may control a manner in which content, that is temporarily stored in a memory associated with cache server 170, is distributed to user device 110. For example, cache server 170 may control a traffic rate (e.g., a data rate, a bandwidth utilization rate, a frame rate, etc.) associated with content being transmitted to user device 110. Cache server 170 may, when controlling the traffic rate, send an instruction to content provider 180, CDS 175, PGW 150, SGW 130, and/or base station 120 to control the traffic rate associated with a traffic flow being transmitted to user device 110.

CDS 175 may include one or more server devices, or other types of devices, that gather, process, search, store, and/or provide information in a manner described herein. CDS 175 may, for example, temporarily store content received from content provider 180. CDS 180 may transcode the content into a format that can be supported by one or more different types of user devices 110. CDS 175 may, for example, generate copies of the content that correspond to different traffic rates, screen sizes, resolution levels, protocols, etc. that are supported by the different types of user devices 110. CDS 175 may, in response to a request for content received from user device 110, distribute the content, via PGW 150, in a format that is supported by user device 110 and/or that conforms to a QoS to which a user of user device 110 has subscribed.

Content provider 180 may include one or more server devices, or other types of computation and communication devices, that provide any type or form of content. For example, content provider 180 may provide free television broadcasts (e.g., local broadcasts, such as NBC, CBS, ABC, and/or Fox), for-pay television broadcasts (e.g., TNT, ESPN, HBO, Cinemax, CNN, etc.), and/or Internet-based content (e.g., Youtube, Vimeo, Netflix, Hulu, Veoh, etc.) streamed from web sites. Content provider 180 may produce media streams (e.g., television broadcasts). A "media stream," as used herein, may refer to stream of content that includes video content (e.g., a video stream), audio content (e.g., an audio stream), textual content (e.g., a textual stream), and/or a combination of the aforementioned content. Additionally, or alternatively, content provider 180 may provide web pages, documents, images, advertising content, audio, video, text, data, etc. Content provider 180 may also, or alternatively, provide applications and/or services, such as games, scripts, messaging services, etc.

Network 190 may include one or more wired and/or wireless networks. For example, network 190 may include a cellular network, a public land mobile network (PLMN), a second generation (2G) network, a third generation (3G) network, a fourth generation (4G) network, a fifth generation (5G) network, and/or another network. Additionally, or alternatively, network 190 may include a wide area network (WAN), a metropolitan area network (MAN), a telephone network (e.g., the Public Switched Telephone Network (PSTN)), an ad hoc network, an intranet, the Internet, a fiber optic-based network (e.g., FiOS), and/or a combination of these or other types of networks.

Figure 2A:
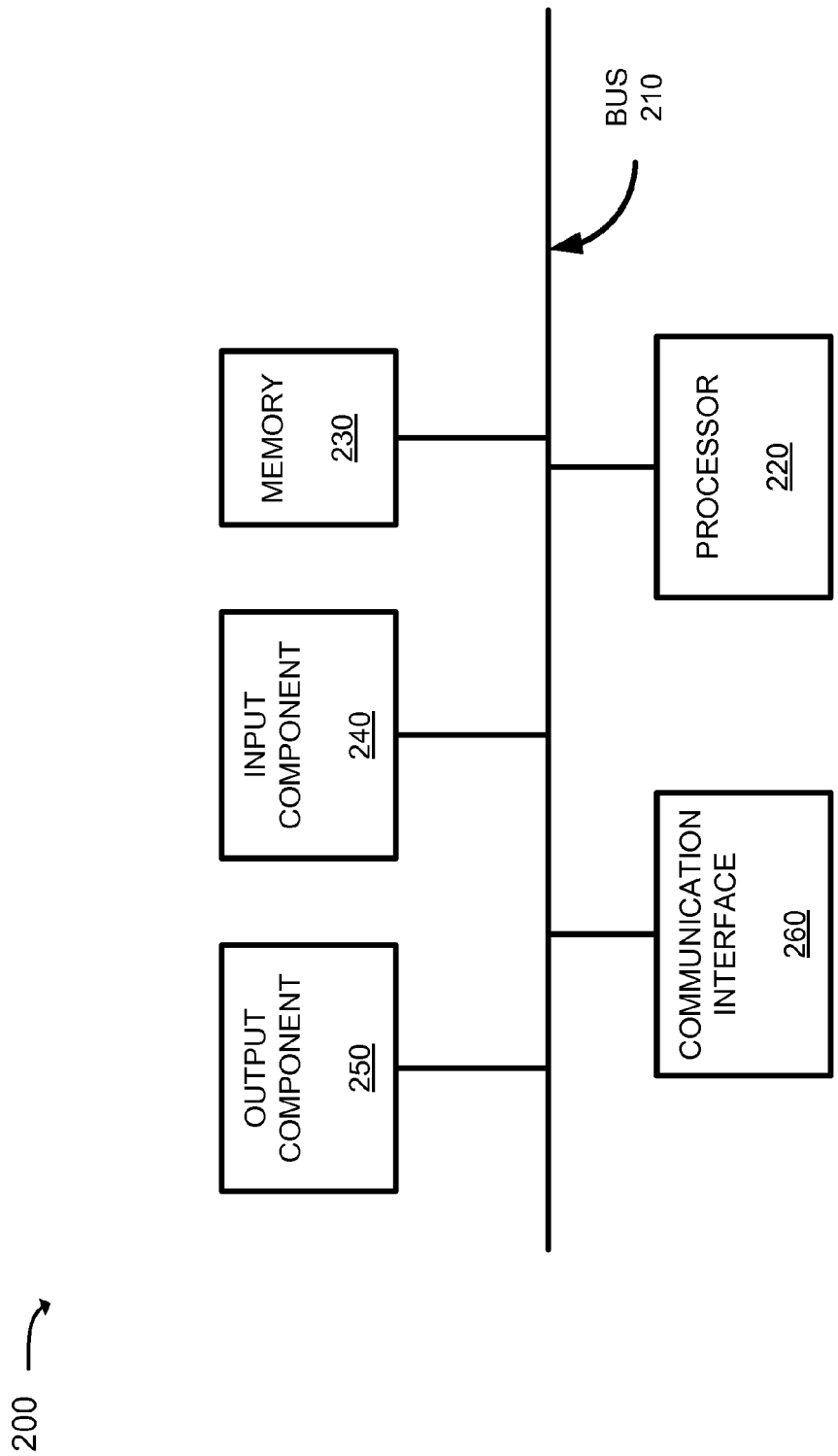
FIG. 2A is a diagram of example components of one or more devices of FIG. 1.

FIG. 2A is a diagram of example components of a device 200. Device 200 may correspond to user device 110, SGW, 130, MME 140, PGW 150, HSS/AAA server 155, CSCF server 160, cache server 170, CDS 175, and/or content provider 180. Alternatively, or additionally, each of user device 110, SGW 130, MME 140, PGW 150, HSS/AAA server 155, CSCF server 160, cache server 170, CDS 175, and/or content provider 180 may include one or more devices 200 and/or one or more components of device 200.

Device 200 may include a bus 210, a processor 220, a memory 230, an input component 240, an output component 250, and a communication interface 260. Although FIG. 2A shows example components of device 200, in other implementations, device 200 may contain fewer components, additional components, different components, or differently arranged components than depicted in FIG. 2A. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, a microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications, wired communications, or a combination of wireless and wired communications. For example, communication interface 260 may include mechanisms for communicating with another device or system via a network, such as network 190. In one alternative implementation, communication interface 260 may be a logical component that includes input and output ports, input and output systems, and/or other input and output components that facilitate the transmission of data to other devices.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 2B:
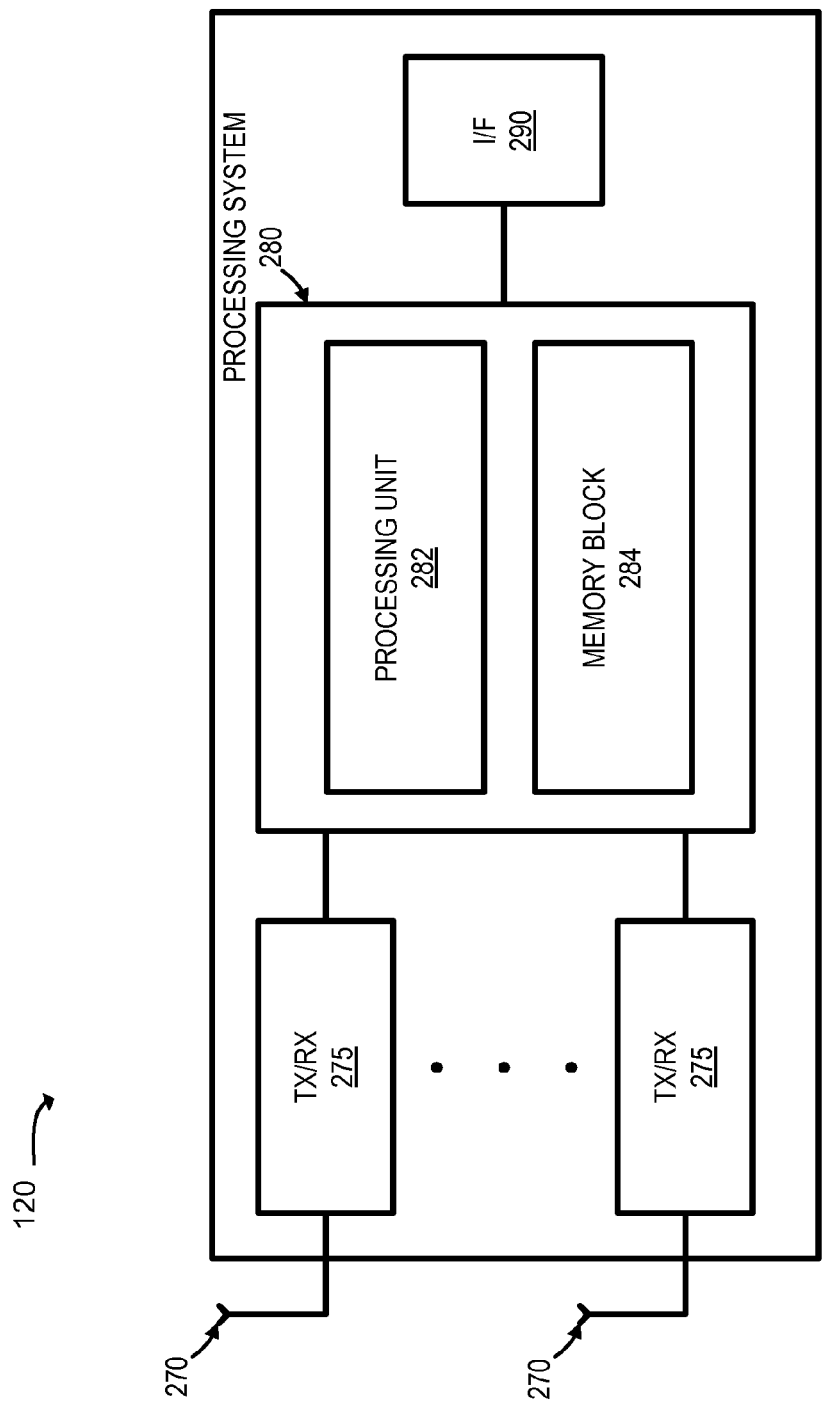
FIG. 2B is a diagram of example components of a base station of FIG. 1.

FIG. 2B is a diagram of example components of base station 120 according to an implementation described herein. As shown in FIG. 2B, base station 120 may include antennas 270, transceivers (TX/RX) 275, a processing system 280, and an interface (I/F) 290. Base station 120 may include fewer components, additional components, different components, and/or differently arranged components than those illustrated in FIG. 2B. Additionally, or alternatively, one or more operations described as being performed by a particular component of base station 120 may be performed by one or more other components, in addition to or instead of the particular component of base station 120.

Antennas 270 may include one or more directional and/or omnidirectional antennas. Transceivers 275 may be associated with antennas 270 and include transceiver circuitry for transmitting and/or receiving traffic within a network, such as a wireless network, via antennas 270.

Processing system 280 may control the operation of base station 120. Processing system 280 may also process information received via transceivers 275 and interface 290. Processing system 280 may further measure quality and strength of a connection and determine a frame error rate (FER), and transmit this information to MME 140 and/or some other device. As illustrated, processing system 280 may include a processing unit 282 and a memory block 284. Alternatively, or additionally, processing system 280 may include fewer components, additional components, different components, and/or differently arranged components than illustrated in FIG. 2B.

Processing unit 282 may include one or more processors, microprocessors, etc, and may process information received via transceivers 275 and interface 290. The processing may include, for example, data conversion, forward error correction (FEC), rate adaptation, Wideband Code Division Multiple Access (WCDMA) spreading/dispreading, and quadrature phase shift keying (QPSK) modulation, etc. In addition, processing unit 282 may generate control messages and/or data messages (e.g., within high speed-downlink shared channel (HS-DSCH) data frames) and cause those control messages and/or data messages to be transmitted via transceivers 275 and/or interface 290. Processing unit 282 may also process control messages and/or data messages received from transceivers 275 and/or interface 290.

Memory block 284 may include any type of dynamic storage device that may store information and instructions, for execution by processing unit 282, and/or any type of non-volatile storage device that may store information for use by processing unit 282. Memory block 284 may store information (e.g., in the form of protocol data units (PDUs)) to be transmitted to and/or that has been received from user device 110. In one example, each user device 110 associated with base station 120 may be associated with one or more priority queues from memory block 284. A priority queue may, for example, be initialized for user device 110 when a media access control-d (MAC-d) flow is established for that user device 110.

Memory block 284 may map received logical channel identifiers to priority queue identifiers. In one example, a HS-DSCH framing protocol type 2 data frame may associate one or more logical channel identifiers with one or more PDUs stored in the data frame. Interface 290 may include one or more input/output components that allow base station 120 to transmit data to and receive data from SGW 130, MME 140, cache server 170, etc.

Figure 3:
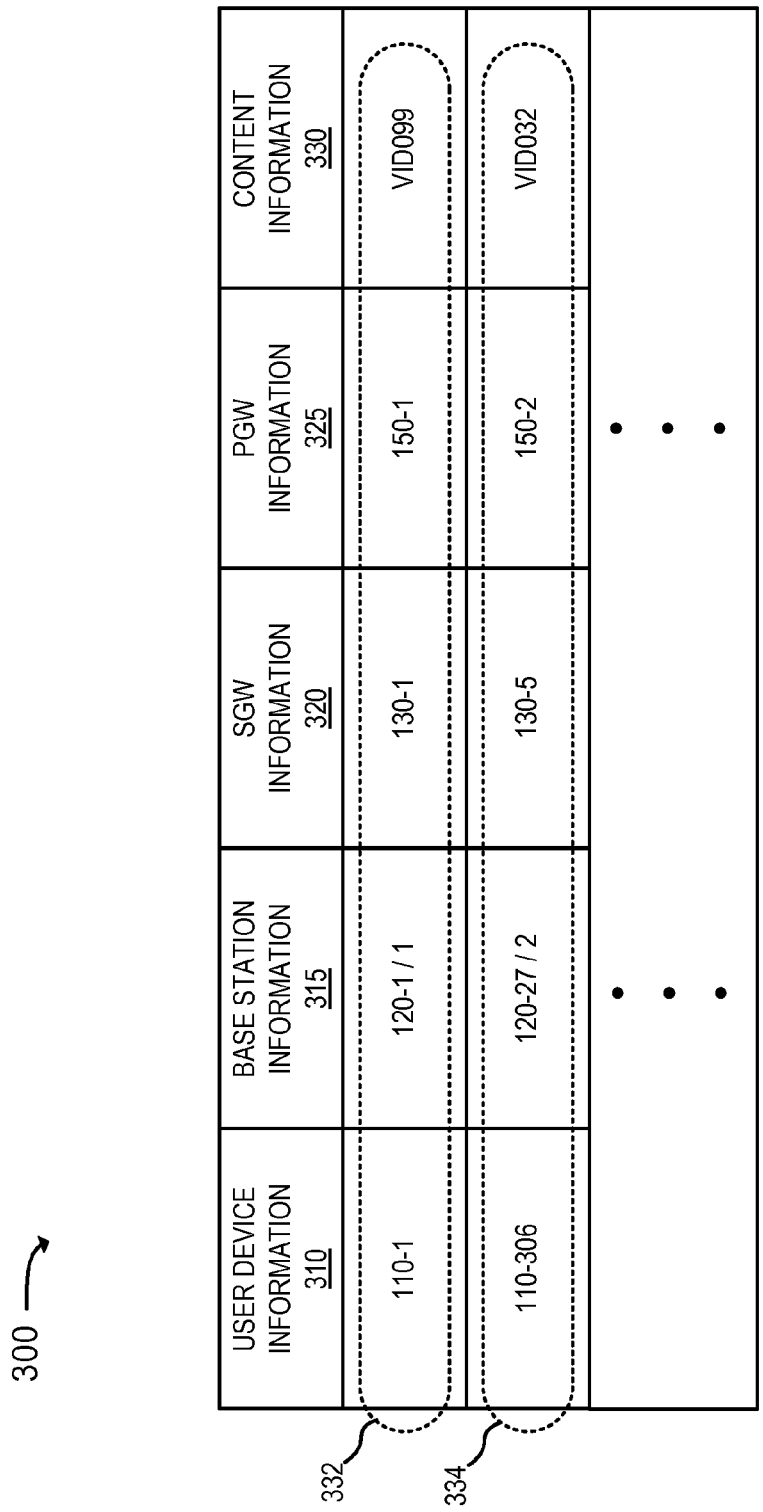
FIG. 3 is a diagram of an example data structure that may store information associated with content being provided to a user device.

FIG. 3 is a diagram of an example data structure 300 that may store information associated with content provided to user device 110. Data structure 300 may be stored in a memory associated with cache server 170 and/or CDS 175. As illustrated in FIG. 3, data structure 300 may include a collection of fields, such as a user device information field 310, a base station information field 315, a SGW information field 320, a PGW information field 325, and a content information field 330. The quantity of fields within data structure 300 is provided for explanatory purposes. Alternatively, or additionally, there may be additional fields, fewer fields, different fields, or differently arranged fields than are shown in FIG. 3.

User device information field 310 may store information associated with a particular user device 110 that has transmitted a request to receive content. The information, associated with the particular user device 110, may include a device identifier (e.g., a mobile directory number (MDN), a landline directory number (LDN), etc.), a network address (e.g., an Internet protocol (IP) address, a media access control (MAC) address, etc.), information associated with a user of user device 110 (e.g., a username, password, PIN, etc.), information identifying a type of user device 110 (e.g., a model number, a brand name, a manufacturer name, etc.), etc. User device information field 310 may also, or alternatively, store information identifying a format supported by the particular user device 110, such as a traffic rate (e.g., a data rate, a bandwidth utilization rate, a frame rate, etc.), a level of resolution, a screen size and/or dimensions, etc. User device information field 310 may also, or alternatively, store information that identifies a level of QoS (e.g., a forwarding priority, such as best efforts, assured forwarding, expedited forwarding, etc.) to which a user, of the particular user device 110, is subscribed.

Base station information field 315 may store information that identifies a particular base station 120 and/or a cell via which the particular user device 110 is communicating when sending the request for content and/or receiving content in response to the request. For example, the information that identifies the particular base station 120 and/or cell may include a device identifier (e.g., an electronic serial number (ESN), etc.), an address (e.g., an IP address, a MAC address, etc.), a cell identifier, etc.

SGW information field 320 may store information that identifies a particular SGW 130 via which the particular user device 110 is communicating. For example, the information that identifies the particular SGW 130 may include a device identifier (e.g., an ESN, etc.), an address (e.g., an IP address, a MAC address, etc.), etc.

PGW information field 325 may store information that identifies a particular PGW 130 via which the particular user device 110 is communicating. For example, the information that identifies the particular PGW 150 may include a device identifier (e.g., an ESN, etc.), an address (e.g., an IP address, a MAC address, etc.), etc.

Content information field 330 may store information that identifies particular content that is requested by the particular user device 110. The information that identifies the particular content may, for example, include a content identifier (e.g., a movie title, a song title, a document title, a file name, etc.); a network address, associated with content provider 180, from which the particular content is to be obtained (e.g., an IP address, a MAC address, a uniform resource locator (URL), etc.); etc.

By way of example, cache server 170 may monitor first traffic being processed by PGW 150. Cache server 170 may, as a result of monitoring the first traffic, identify a traffic flow associated with a request received from user device 110. Cache server 170 may, for example, examine one or more packets (e.g., a packet trailer, header, label, payload, etc.) associated with the traffic flow, and may identify a source address (e.g., associated with user device 110) and/or a destination address (e.g., associated with content provider 180 and/or CDS 175). Cache server 170 may also, or alternatively, identify, within the packets, information associated with content being requested by user device 110. Cache server 170 may also, or alternatively, identify signal bearers via which the traffic flow is being transmitted (e.g., base station 120, SGW 130, PGW 150, etc.). Cache server 170 may store, in data structure 300, information associated with user device 110 based on the source address (e.g., shown as 110-1 in ellipse 332). Cache server 170 may also, or alternatively, store information that identifies, as the signal bearers, base station 120 and/or a cell associated with base station 120 (e.g., 120-1/1), SGW 130 (e.g., 130-1), and/or PGW 150 (e.g., 150-1) (e.g., as shown by ellipse 332). Cache server 170 may also, or alternatively, store information that identifies the content (e.g., VID099) requested by user device 110 (e.g., as shown by ellipse 332).

Additionally, or alternatively, cache server 170 may identify another traffic flow associated with another request for content received from another user device 110 and/or via one or more other signal bearers. Cache server 170 may store information associated with the other request in data structure 300 (e.g., as shown by ellipse 334). Data structure 300 may also, or alternatively, store information associated with requests for content that are being processed by base station 120, SGW 130, and/or CDS 175.

Figure 4A:
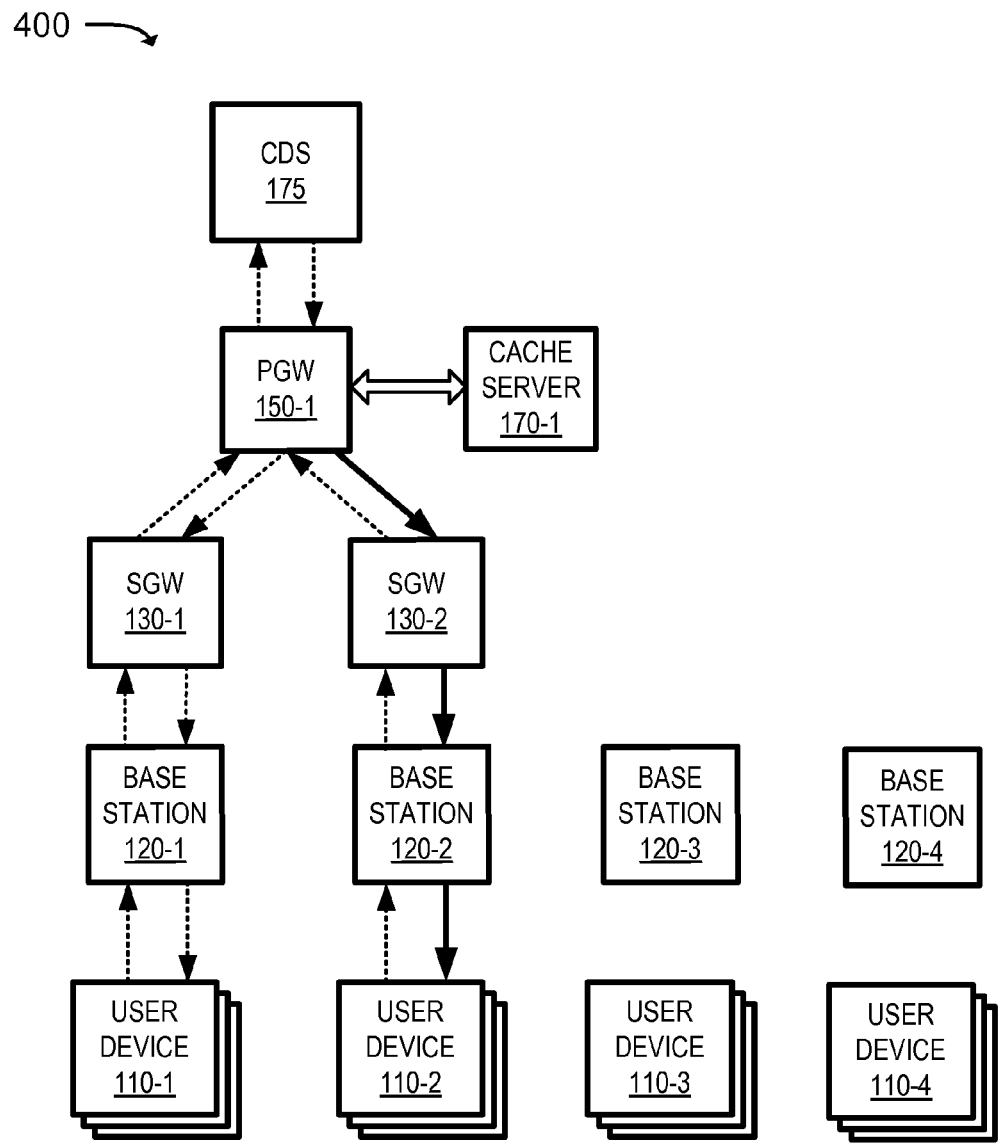
FIGS. 4A-4C are diagrams of local content caching schemes that may be implemented within a network.
Figure 4B:
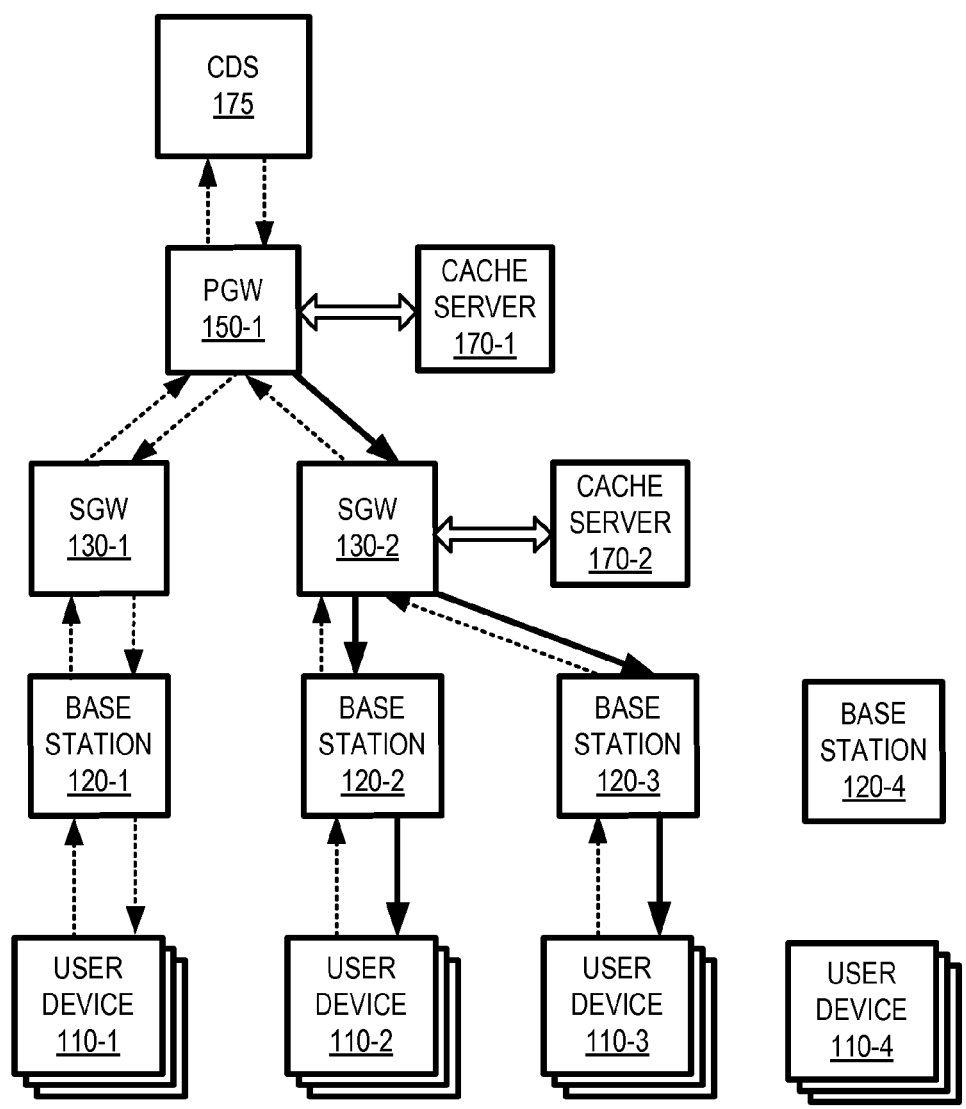
Figure 4C:
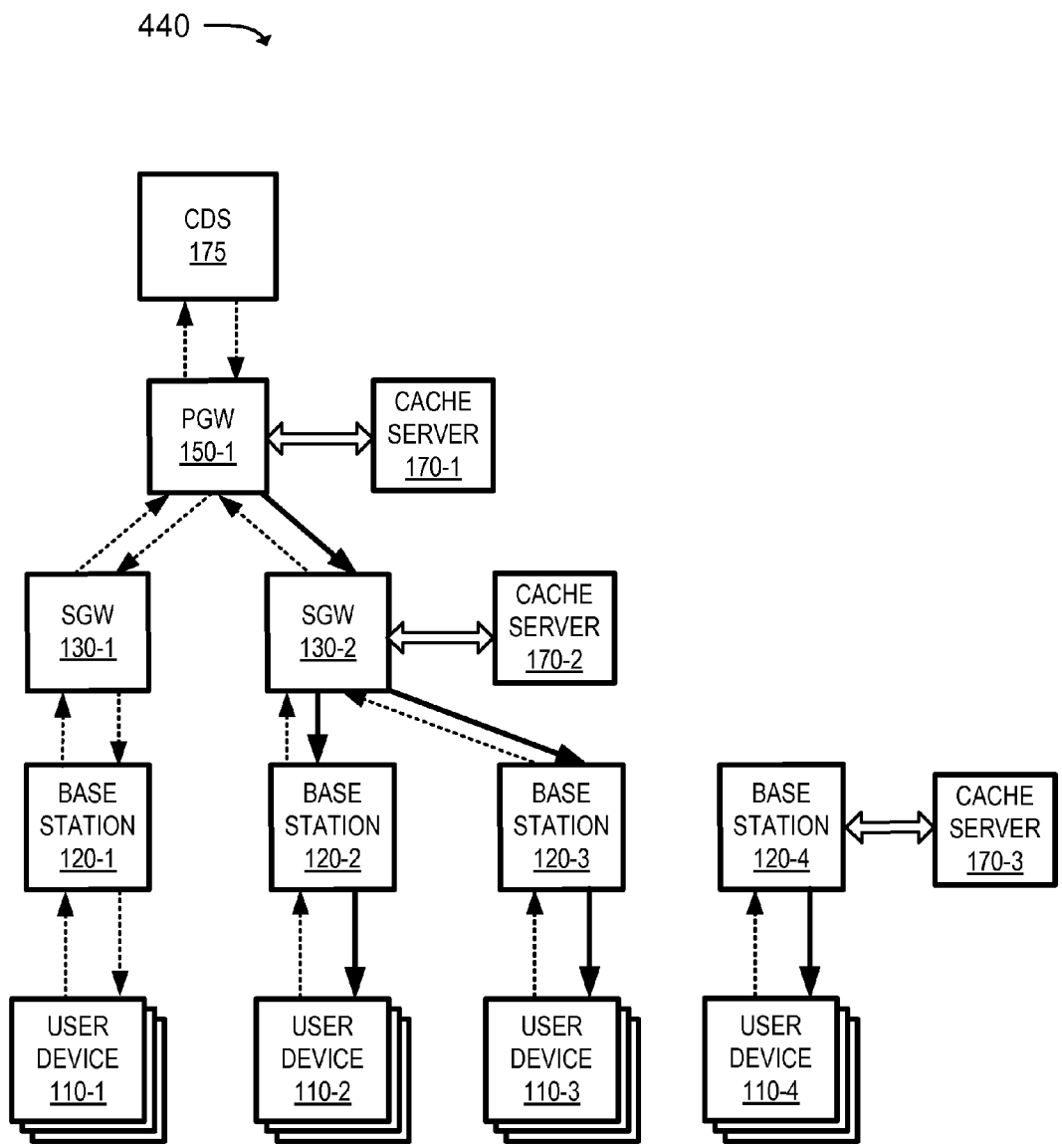

FIGS. 4A-4C are diagrams of local content caching schemes that may be implemented within a network. As shown in FIG. 4A, caching scheme 400 may include a portion of environment 100, such as CDS 175, a first PGW 150-1, a first cache server 170-1, a pair of SGWs 130-1 and 130-2, four base stations 120-1, ..., 120-4, and four sets of user devices 110-1, ..., 110-4. The quantity of devices, shown in caching scheme 400, is provided for explanatory purposes. Alternatively, or additionally, there may be additional devices, fewer devices, different devices, or differently arranged devices than are shown in caching scheme 400.

A first user device 110, associated with a first set of user devices 110 (e.g., user devices 110-1) may send a first request for first content. A second user device 110, associated with a second set of user devices 110 (e.g., user devices 110-2) may send a second request for second content. The first request may be transmitted, by the first user device 110, via a first set of signal bearers (e.g., as shown by the upward-pointing dashed arrows connecting base station 120-1, SGW 130-1, and PGW 150-1 in FIG. 4A). Additionally, or alternatively, the second request may be transmitted, by the second user device 110, via a second set of signal bearers (e.g., as shown by the upward-pointing dashed arrows connecting base station 120-2, SGW 130-2, and PGW 150-1 in FIG. 4A).

PGW 150-1 may receive the first request for the first content and the second request for the second content. PGW 150-1 may also, or alternatively, communicate with cache server 170-1 to determine whether the first content and/or the second content is temporarily stored by cache server 170-1. Based on an indication, received from cache server 170-1, that the first content is not temporarily stored by cache server 170-1, PGW 150-1 may communicate with CDS 175 to obtain the first content (e.g., as shown by the dashed arrows between CDS 175 and PGW 150-1) and may provide the first content to the first user device 110 via the first set of signal bearers (e.g., as shown by the dashed downward-pointing arrows in FIG. 4A).

Additionally, or alternatively, cache server 170-1 may determine that the second content is temporarily stored by cache server 170-1 and may provide the second content to PGW 150-1 (e.g., as shown by the horizontal block arrow in FIG. 4A). PGW 150-1 may provide the second content to the second user device 110 via the second set of signal bearers (e.g., as shown by the solid downward-pointing arrows in FIG. 4A) in a manner that does not include communicating with CDS 175.

As shown in FIG. 4B, caching scheme 420 may include the same portion of environment 100, as described above with respect to caching scheme 400 of FIG. 4A, and may include a second cache server 170 (e.g., cache server 170-2). Cache server 170-2 may be associated with SGW 130-2. In the description below, it may be assumed that the first user device 110 and the second user device 110 have transmitted the first request for the first content and the second request for the second content, respectively. It may also be assumed that PGW 150-1 receives the first request and obtains the first content, from CDS 175, based on the determination that cache server 170-1 does not temporarily store the first content. It may further be assumed that PGW 150-1 provides the first content to the first user device 110 in a manner described above with respect to FIG. 4A.

As shown in FIG. 4B, the second request may be received SGW 130-2 via base station 120-2 (e.g., as shown by the upward-pointing dashed arrows connecting second user device 110, base station 120-2, and SGW 130-2). SGW 130-2 may also, or alternatively, communicate with cache server 170-2 to determine whether the second content is temporarily stored in a memory associated with cache server 170-2. Based on an indication, received from cache server 170-2, that the second content is not temporarily stored in the memory, SGW 130-2 may communicate with PGW 150-1 to obtain the second content (e.g., as shown by the upward pointing dashed arrow between SGW 130-2 and PGW 150-1). PGW 150-1 may, based on the communication, obtain the second content from cache server 170-1 and may provide the second content, to the second user device 110, in a manner similar to that described above with respect to FIG. 4A.

Additionally, or alternatively, a third user device 110, associated with a third set of user devices 110 (e.g., associated with user devices 110-3), may transmit a third request for third content. The third request may be transmitted, by the third user device 110, via base station 120-3 (e.g., as shown by the upward-pointing dashed arrows connecting the third user device 110, base station 120-3, and SGW 130-2 in FIG. 4B).

SGW 130-2 may receive the third request for the third content and may communicate with cache server 170-2 to determine whether the third content is temporarily stored by cache server 170-2. Cache server 170-2 may determine that the third content is temporarily stored by cache server 170-2 and may provide the third content to SGW 130-2 (e.g., as shown by the horizontal block arrow connecting SGW 130-2 and cache server 170-2 in FIG. 4B). SGW 130-2 may provide the third content to the third user device 110 via base station 120-3 (e.g., as shown by the solid downward-pointing arrows connecting SGW 130-2, base station 120-3, and the third user device 110 in FIG. 4B.) in a manner that does not include communicating with PGW 150-1 and/or CDS 175.

As shown in FIG. 4C, caching scheme 440 may include the same portion of environment 100, as described above with respect to caching scheme 420 of FIG. 4B, and may include a third cache server 170 (e.g., cache server 170-3). Cache server 170-3 may be associated with base station 120-4. In the description below, it may be assumed that the first user device 110, the second user device 110-2, and the third user device 110 have transmitted the first request for the first content, the second request for the second content, and the third request for the third content, respectively. It may also be assumed that PGW 150-1 processes the first request by obtaining the first content, from CDS 175, based on the determination that cache server 170-1 does not temporarily store the first content. It may further be assumed that PGW 150-1 provides the first content to the first user device 110 in a manner described above with respect to FIG. 4A. It may still further be assumed that PGW 150-1 processes the second request by obtaining the second content from cache server 170-1 and providing the second content to the second user device 110 in the manner described with respect to FIG. 4A. It may be further assumed that SGW 130-2 processes the third request by obtaining the third content from cache server 170-2 and providing the third content to the third user device 110 in a manner similar to that described above with respect to FIG. 4B.

As shown in FIG. 4C, a fourth user device 110, associated with a fourth set of user devices 110 (e.g., user devices 110-4) may send a fourth request for fourth content. Base station 120-4 may receive the fourth request and may communicate with cache server 170-3 to determine whether the fourth content is temporarily stored in a memory associated with cache server 170-3. Based on a determination that the fourth content is stored within the memory, cache server 170-3 may provide the fourth content to base station 120-4 (e.g., as shown by the horizontal block arrow connecting base station 120-4 and cache server 170-3 in FIG. 4C). Base station 120-4 may provide the fourth content to the fourth user device 110 (e.g., as shown by the downward pointing arrow that connects base station 120-4 to the fourth user device 110 in FIG. 4C) in a manner that does not include communicating with SGW 130-2, PGW 150-1, or CDS 175 to obtain the fourth content.

FIG. 5 is a diagram of an example data structure 500 that may store information associated with requests, for content, being processed by one or more devices associated with a network. Data structure 500 may be stored in a memory associated with cache server 170 and/or CDS 175. As shown, data structure 500 may include a collection of fields, such as content information field 505, a PGW request field 510, a group of SGW request fields 515-1, . . . , 515-3 (hereinafter referred to collectively as "SGW request fields 515" and individually as "SGW request field 515"), and a group of base station request fields 520-1, . . . , 520-9 (hereinafter referred to collectively as "base station request fields 520" and individually as "base station request field 520"). The quantity of fields shown in data structure 500 is provided for explanatory purposes only. Alternatively, or additionally, there may be additional fields, fewer fields, different fields, or differently arranged fields than are shown with respect to FIG. 5.

Content information field 505 may store information that identifies particular content that is requested by one or more user devices 110. The information that identifies the particular content may, for example, include a content identifier (e.g., a movie title, a song title, a document title, a file name, etc.); a network address, associated with content provider 180, from which the particular video content can be obtained (e.g., an IP address, a MAC address, a URL, etc.); etc.

PGW request field 510 may store a first value (e.g., 0, 1, 10, 100, 1000, etc.) that corresponds to a quantity of requests, for the particular content, that have been received, by PGW 150 and via one or more SGWs 130, over a time period.

SGW request field 515 may store a second value (e.g., 0, 1, 10, 100, 1000, etc.) that corresponds to another quantity of requests, for the particular content, that have been received, by SGW 130 and via one or more base stations 120, over the time period. Each SGW request field 515 (e.g., SGW request fields 515-1-515-3), may correspond to a respective SGW 130 (e.g., SGW 130-1-130-3) associated with PGW 150. Thus, the first value identified by PGW request field 510 may be equal to a sum of second values identified by SGW request fields 515.

Base station request field 520 may store a third value (e.g., 0, 1, 10, 100, 1000, etc.) that corresponds to a further quantity of requests, for the particular content, that have been received, by base station 120 and from one or more user devices 110, over the time period. Each base station request field 520 (e.g., base station request fields 520-1-520-9), may correspond to a respective base station 120 (e.g., base station 120-1-120-9).

Additionally, or alternatively, a first set of base station request fields 520 (e.g., base station request fields 520-1-520-3) may correspond to a first set of base stations 120 (e.g., base stations 120-1-120-3) that are served by a first SGW 130 (e.g., SGW 130-1) associated with PGW 150. Thus, the second value identified by SGW request field 515-1 may be equal to a sum of third values identified by the first set of base station request fields 520. Additionally, or alternatively, and in a manner similar to that described above, a second set of base station request fields 520 (e.g., base station request fields 520-4-520-7) may correspond to a second set of base stations 120 (e.g., base stations 120-4-120-7) that are served by a second SGW 130 (e.g., SGW 130-2) associated with PGW 150. Thus, the second value identified by SGW request field 515-2 may be equal to a sum of third values identified by the second set of base station request fields 520.

Additionally, or alternatively, and in a manner similar to that described above, a third set of base station request fields 520 (e.g., base station request fields 520-8 and 520-9) may correspond to a third set of base stations 120 (e.g., base stations 120-8 and 120-9) that are served by a third SGW 130 (e.g., SGW 130-3) associated with PGW 150. Thus, the second value identified by SGW request field 515-3 may be equal to a sum of third values identified by the third set of base station request fields 520.

Figure 6:
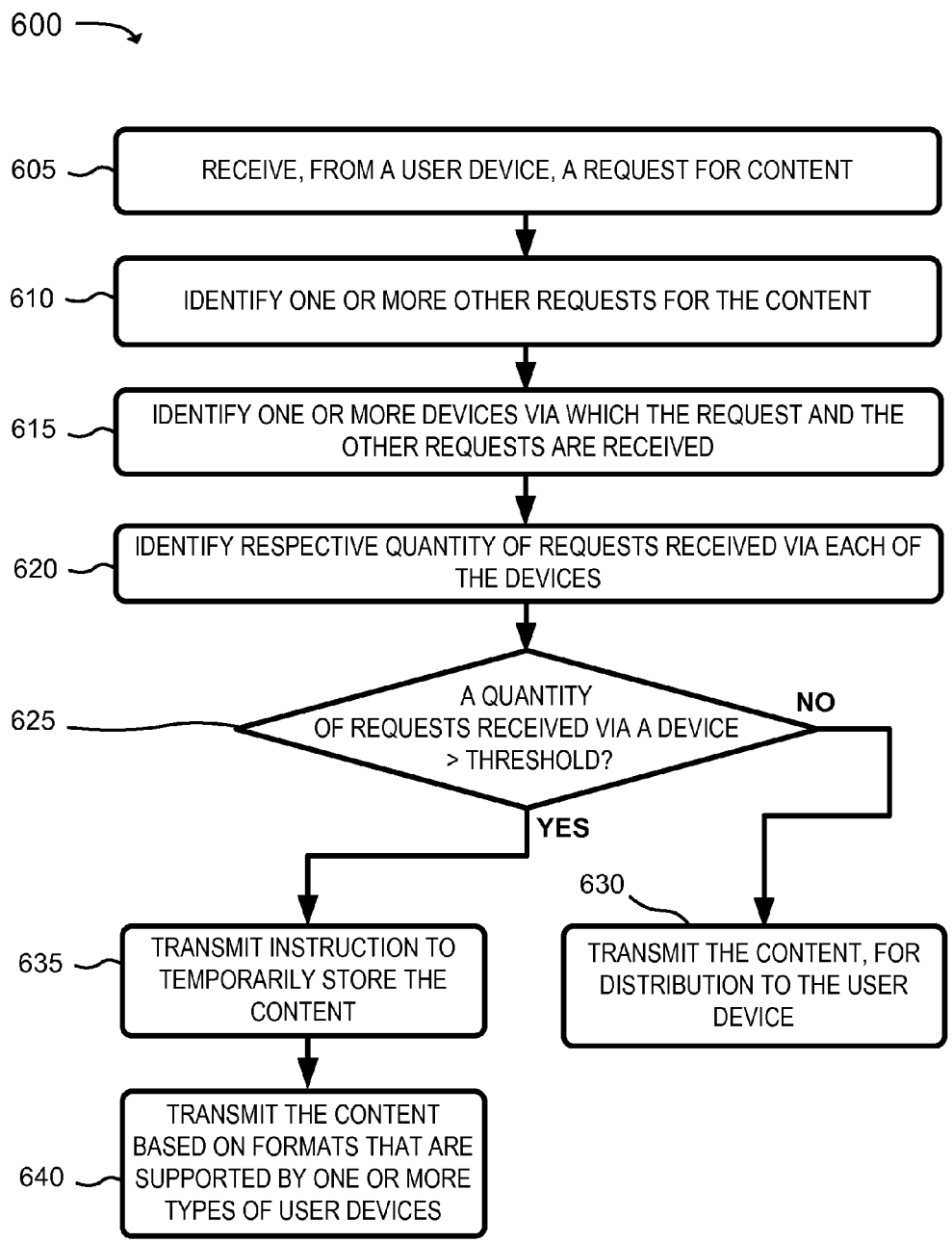
FIG. 6 is a flow chart of an example process for permitting a content distribution server to determine whether content is to be temporarily stored, in a network device, for provisioning to a user device.

FIG. 6 is a flow chart of an example process 600 that may permit CDS 175 to determine whether content is to be temporarily stored, in a network device, for provisioning to user device 110. In an example implementation, process 600 may be performed by CDS 175. Alternatively, or additionally, some or all of process 600 may be performed by a device or collection of devices separate from, or in combination with CDS 175.

As shown in FIG. 6, process 600 may include receiving, from a user device, a request for content (block 605) and identifying one or more other requests for the content (block 610). For example, user device 110 may transmit, to CDS 175, a request to receive content (e.g., video content, audio content, etc.). CDS 175 may receive the request and may obtain, from a packet associated with the request (e.g., a packet header, trailer, label, payload, etc.), information associated with the request. The information, associated with the request, may identify the content (e.g., a movie title, a song title, a document title, a file name, etc.) being requested by user device 110, the signal bearers via which the request was transported (e.g., first base station 120, first SGW 130, first PGW 150, etc.), information associated with user device 110, such as a device identifier (e.g., a MDN, LDN, etc.), an address (e.g., an IP address, a MAC address, etc.), etc.

Additionally, or alternatively, CDS 175 may identify, within a memory associated with CDS 175 (e.g., within data structure 300 of FIG. 3), information associated with other requests, for the content, that have been received by CDS 175. The information, associated with the other requests, may, for example, identify the content requested by user device 110 and/or other user devices 110, signal bearers via which the other requests were transported (e.g., one or more base stations 120, SGWs 130, PGWs 150, etc.), information associated with user device 110 and/or the other user devices 110, etc.

As also shown in FIG. 6, process 600 may include identifying one or more devices via which the request and/or the other requests are received (block 615) and identifying a respective quantity of requests received via each of the devices (block 620). For example, CDS 175 may, based on the information associated with the request and the information associated with the other requests, identify one or more PGWs 150 via which the requests (e.g., the request and the other requests) have been received. Additionally, or alternatively, CDS 175 may identify a respective quantity of requests received via each PGW 150 over a period of time.

As further shown in FIG. 6, if a quantity of requests, received via a device, is not greater than a threshold (block 625—NO), then process 600 may include transmitting the content for distribution to the user device (block 630). For example, CDS 175 may compare the respective quantity of requests, received via each of PGWs 150 over the period of time, to a threshold that is predetermined by CDS 175 and/or an operator of CDS 175. When the respective quantity of requests is not greater than the threshold, CDS 175 may cause the content to be distributed, via other devices, to user device 110 from which the request was received. CDS 175 may, in one example, retrieve the content from a memory associated with CDS 175. In another example, CDS 175 may communicate with content provider 180 to obtain the content if the content is not stored in the memory.

Additionally, or alternatively, CDS 175 may process the content so that the content may be provided to user device 110 in a format that is supported by user device 110. CDS 175 may, for example, communicate with HSS/AAA server 155 to identify a QoS level to which a user, of user device 110, has subscribed and/or to identify a type, model, brand, etc., associated with user device 110. CDS 175 may also, or alternatively, transcode the content to permit the content to be provided to user device 110 at a traffic rate (e.g., a data rate, a bandwidth utilization rate, a frame rate, etc.), a level of resolution (e.g., high definition, standard definition, etc.), a compression ratio, a screen size (e.g., aspect ratio, pixel quantity, etc.), etc. that is supported by user device 110. CDS 175 may transmit the content to first PGW 150 and may instruct first PGW 150 to provide the content to user device 110 in a manner that conforms to the QoS level for which the user of user device 110 has subscribed. PGW 150 may receive the instruction and the content. PGW 150 may also, or alternatively, transmit the content, to user device 110 and via first SGW 130 and/or first base station 120, in a manner that conforms to the QoS level.

As still further shown in FIG. 6, if a quantity of requests, received via a device, is greater than the threshold (block 625—YES), process 600 may include transmitting an instruction to temporarily store the content (block 635) and transmitting the content based on formats that are supported by one or more types of user devices (block 640). For example, CDS 175 may determine that a respective quantity of requests, received via first PGW 150, is greater than the threshold based on the comparison of the respective quantity of requests to the threshold. When the respective quantity of requests is greater than the threshold, CDS 175 may transmit an instruction that causes first PGW 150 to temporarily store the content. CDS 175 may, in one example, retrieve the content from a memory associated with CDS 175. In another example, CDS 175 may communicate with content provider 180 to obtain the content if the content is not stored in the memory.

Additionally, or alternatively, CDS 175 may generate copies of the content that conform to formats that are supported by different types of user devices 110. For example, CDS 175 may transcode copies of the content at different traffic rates, different levels of resolution, different compression ratios, different screen sizes, etc. that conform to traffic rates, levels of resolution, compression ratios, screen sizes, etc. that can be processed by the different types of user devices 110. CDS 175 may transmit the copies of the content to first PGW 150.

First PGW 150 may receive the instruction and/or the copies of the content and may communicate with cache server 170 to temporarily store the copies of the content. Additionally, or alternatively, first PGW 150 may select a copy of the content that corresponds to the format that is supported by user device 110. The first PGW 150 may also, or alternatively, transmit the content to user device 110, via first SGW 130 and/or first base station 120, at a QoS level to which user device 110 is subscribed.

Figure 7:
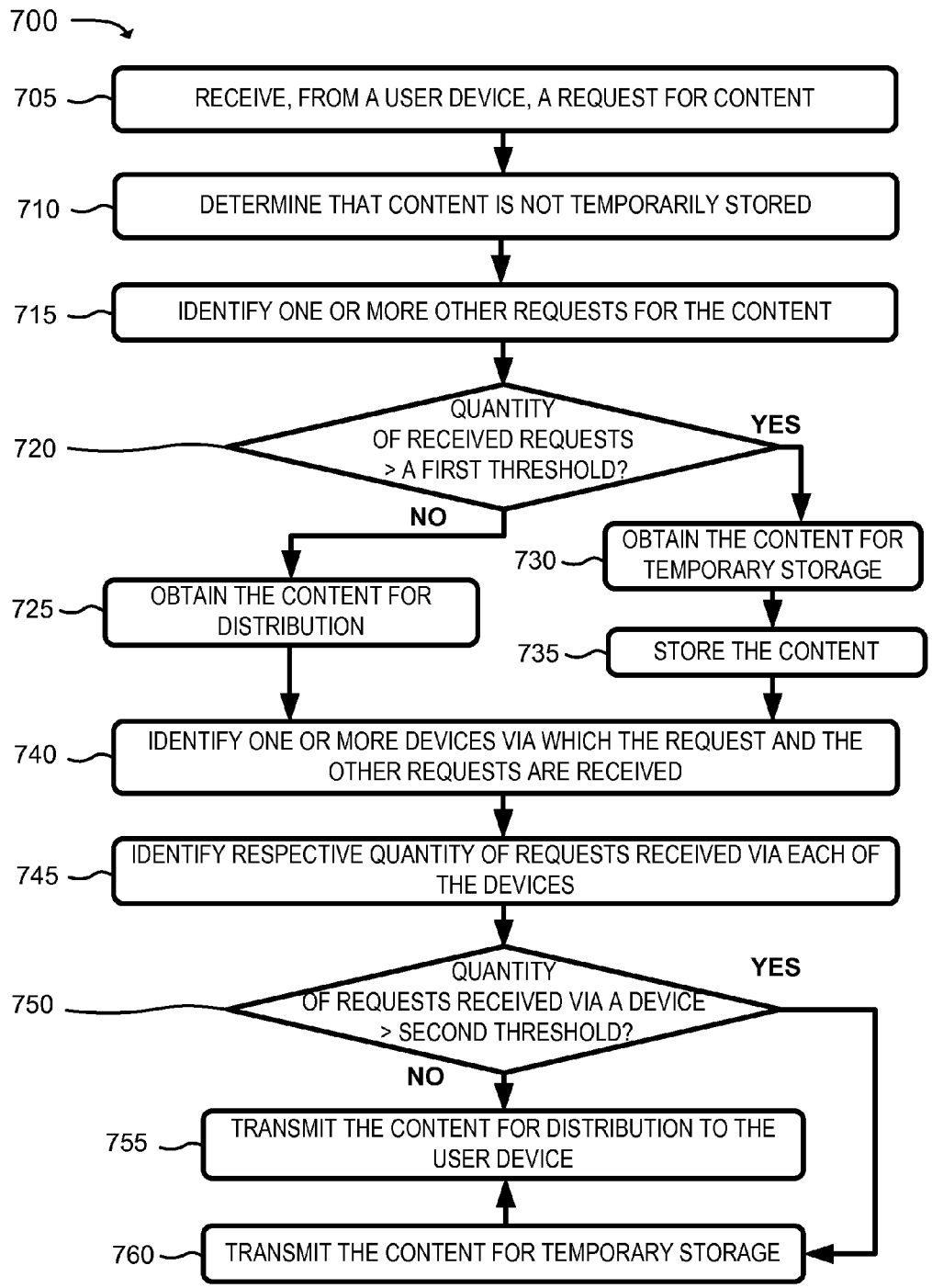
FIG. 7 is a flow chart of an example process for permitting a network device to determine whether content is to be temporarily stored for provisioning to a user device.

FIG. 7 is a flow chart of an example process 700 that may permit a network device to determine whether content is to be temporarily stored for provisioning to user device 110. In an example implementation, process 700 may be performed by cache server 170. Alternatively, or additionally, some or all of process 700 may be performed by a device or a collection of devices separate from, or in combination with cache server 170.

In the description below, process 700 is described with reference to cache server 170 being associated with PGW 150. Alternatively, or additionally, process 700 may be performed with reference to cache server 170 being associated with SGW 130 or being associated with base station 120.

As shown in FIG. 7, process 700 may include receiving, from a user device, a request for content (block 705), determining that the content is not temporarily stored (block 710) and identifying one or more other requests for the content (block 715). For example, user device 110 may transmit a request to receive content (e.g., video content, audio content, etc.). PGW 150 may receive the request and may obtain, from a packet associated with the request (e.g., a packet header, trailer, label, payload, etc.), information associated with the request. The information, associated with the request, may identify the content (e.g., a movie title, a song title, a document title, a file name, etc.) being requested by user device 110, the signal bearers via which the request was transported (e.g., first base station 120, first SGW 130, etc.), information associated with user device 110, such as a device identifier (e.g., a MDN, LDN, etc.), an address (e.g., an IP address, a MAC address, etc.), etc. PGW 150 may transmit the request to cache server 170. Cache server 170 may receive the request and may store the information, associated with the request, in a memory associated with cache server 170.

Additionally, or alternatively, cache server 170 may determine whether other content, stored in a memory associated with cache server 170, corresponds to the content identified by the request. Based on a determination that the other content does not correspond to the content identified by the request, cache server 170 may determine that the content is not temporarily stored in the memory. If, however, cache server 170 determines that the content is stored within the memory, cache server 170 may retrieve the content and may provide the content, to user device 110, in a manner to be described in greater detail below.

Based on a determination that the content is not stored in the memory, cache server 170 may retrieve, from the memory, information associated with other requests, for the content, that have been received by PGW 150 over a period of time. The information, associated with the other requests, may identify the content requested by user device 110 and/or other user devices 110, signal bearers via which the other requests were transported (e.g., one or more base stations 120, SGWs 130, etc.), information associated with user device 110 and/or the other user devices 110, etc.

As also shown in FIG. 7, if a quantity of received requests is not greater than a first threshold (block 720—NO), process 700 may include obtaining the content for distribution (block 725). For example, cache server 170 may identify a quantity of received requests based on the information associated with the request and the information associated with the other requests. Additionally, or alternatively, cache server 170 may compare the quantity of received requests with a first threshold that is predetermined by cache server 170 and/or an operator associated with cache server 170.

When the quantity of received requests is not greater than the first threshold, cache server 170 may obtain the content for distribution to user device 110. For example, cache server 170 may instruct PGW 150 to obtain, from CDS 175, content for distribution to user device 110. Additionally, or alternatively, cache server 175 may communicate with HSS/AAA server 155 to obtain information identifying a type of user device 110 and/or a QoS level to which a user, of user device 110, has subscribed. Cache server 170 may provide the information, identifying the type of user device 110, to PGW 150. PGW 150 may receive the instruction and/or the information identifying the type of user device 110. PGW 150 may also, or alternatively, send a request, to CDS 175, for the content. The request may include the information identifying the type of user device 110 that enables CDS 175 to provide content in a format that is supported by user device 110. CDS 175 may receive the request and may provide, to PGW 150, the content that conforms to the format that is supported by user device 110.

Alternatively, or additionally, cache server 170 may, based on the information identifying the type of user device 110 and in a manner similar to that described above with respect to blocks 625 and 630 of FIG. 6, process content received from CDS 175 to conform to a format that is supported by user device 110.

As further shown in FIG. 7, if the quantity of received requests is greater than the first threshold (block 720—YES), process 700 may include obtaining the content for temporary storage (block 730) and storing the content (block 735). For example, cache server 170 may determine that the quantity of received requests is greater than the first threshold based on the comparison of the quantity of received requests with the first threshold.

When the quantity of received requests is greater than the first threshold, cache server 170 may instruct PGW 150 to obtain, from CDS 175, content for temporary storage in a memory associated with cache server 170. PGW 150 may, based on the instruction, transmit a request, to CDS 175, for the content to be temporarily stored in the memory. CDS 175 may receive the request and may, in a manner similar to that described above, with respect to block 625 of FIG. 6, retrieve and/or generate one or more copies of the content that conform to formats that are supported by different types of user devices 110. CDS 175 may also, or alternatively, transmit the copies of the content to PGW 150. PGW 150 may receive the copies of the content and may transmit the copies of the content to cache server 170 for temporary storage within the memory.

In another example implementation, CDS 175 may transmit the content to PGW 150. PGW 150 may receive the content and may transmit the content to cache server 170. Cache server 170 may receive the content and may, in a manner similar to that described above, with respect to block 625 of FIG. 6, generate the one or more copies of the content that conform to the formats that are supported by the different types of user devices 110. Cache server 170 may store the one or more copies of the content in a memory associated with cache server 170.

As yet further shown in FIG. 7, process 700 may include identifying one or more devices via which the request and/or the other requests are received (block 740) and identifying a respective quantity of requests received via each of the devices (block 745). For example, cache server 170 may, based on the information associated with the request and/or the information associated with the other requests, identify one or more SGWs 130 via which the requests for the content (e.g., the request and the other requests) have been received by PGW 150. Additionally, or alternatively, cache server 170 may identify a respective quantity of requests received via each of the identified SGWs 130 over a period of time.

Additionally, or alternatively, cache server 170, based on the information associated with the request and/or the information associated with the other requests, identify one or more base stations 120 via which the requests for the content have been received. Additionally, or alternatively, cache server 170 may identify a respective quantity of requests received via each base station 120 over the period of time.

As still further shown in FIG. 7, if a quantity of requests, received via a device, is not greater than a second threshold (block 750—NO), process 700 may include transmitting the content for distribution to the user device (block 755). For example, CDS 175 may compare the respective quantity of requests, received via each of SGWs 130 over the period of time, to a second threshold that is predetermined by cache server 170 and/or an operator of cache server 170.

When the respective quantity of requests is not greater than the second threshold, cache server 170 may instruct PGW 150 to transmit the content, obtained from CDS 175 and that conforms to a format that is supported by user device 110, for distribution to user device 110. The instruction may identify the QoS level to which user device 110 is subscribed that enables PGW 150, SGW 130, and/or base station 120 to transmit the content to user device 110 in a manner that conforms to the QoS level.

As also shown in FIG. 7, if the quantity of requests, received via the device, is greater than the second threshold (block 750—YES), process 700 may include transmitting the content for temporary storage (block 760) and transmitting the content for distribution to the user device (block 755). For example, cache server 170 may determine that a respective quantity of requests, received via first SGW 130, is greater than the second threshold based on the comparison of the respective quantity of requests to the second threshold.

When the respective quantity of requests is greater than the second threshold, cache server 170 may transmit an instruction, to another cache server 170 associated with first SGW 130, to temporarily store the content for temporary storage. Additionally, or alternatively, cache server 170 may transmit copies of the content to the other cache server 170 for temporary storage in a memory associated with the other cache server 170.

Additionally, or alternatively, cache server 170 may determine that a respective quantity of requests, received by first base station 120, is greater than a third threshold. When the respective quantity of requests, received by first base station 120, is greater than the third threshold, cache server 170 may transmit an instruction, to a further cache server 170 associated with first base station 120, to temporarily store the content for temporary storage. Additionally, or alternatively, cache server 170 may transmit copies of the content to the further cache server 170 for temporary storage in a memory associated with the further cache server 170.

Alternatively, or additionally, the other cache server 170, associated with first SGW 130, may determine that the quantity of requests for the content, received by first SGW 130, is greater than the second threshold. When the quantity of requests for the content is greater than the second threshold, the other cache server 170 may communicate with cache server 170 associated with PGW 150 and/or CDS 175 to obtain the content for temporary storage in the memory associated with the other cache server 170.

Alternatively, or additionally, the further cache server 170, associated with first base station 120, may determine that the quantity of requests for the content, received by first base station 120, is greater than the third threshold. When the quantity of requests for the content is greater than the third threshold, the further cache server 170 may communicate with the other cache server 170, cache server 170, and/or CDS 175 to obtain the content for temporary storage in the memory associated with the further cache server 170.

Cache server 170 may select a copy of the content that conforms to a format that is supported by user device 110 and may instruct PGW 150 to transmit the content for distribution to user device 110. The instruction may identify the QoS level to which user device 110 is subscribed. PGW 150 may receive, from cache server 170, the instruction and/or the copy of the content and may transmit the copy of the content, to user device 110 via first SGW 130 and/or first base station 120, in a manner that conforms to the QoS level.

Systems and/or methods, described herein, may enable a network device to temporarily store particular content, received from a content provider, for provisioning to one or more user devices. The network device may temporarily store the particular content when a quantity of user devices, requesting the content, is greater than a threshold level. The network device may, in response to a request for the particular content and from a user device, retrieve the particular content that has been temporarily stored. The network device may provide, to a user device, the particular content in a format that is supported by the user device and/or in a manner for which a user of the user device has subscribed.

The systems and/or methods may enable a content provider to cause particular content to be temporarily stored in the network device for distribution to one or more user devices.

When a quantity of requests, for the particular content, received via the network device is greater than the threshold level, the content provider may instruct the network device to temporarily store the particular content. The content provider may transmit the particular content, to the network device, in one or more formats that are supported by different types of user devices.

Temporarily storing particular content in the network device may decrease network resource utilization by reducing a quantity of requests, between the network device and the content provider, to obtain the particular content and/or to distribute the particular content to the user device.

The foregoing description provides illustration and description, but is not intended to be exhaustive or to limit the implementations to the precise form disclosed. Modifications and variations are possible in light of the above disclosure or may be acquired from practice of the embodiments.

While series of blocks have been described with regard to FIGS. 4, 6 and 7, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
receiving, by a network device and from a user device, a request for content;
determining, by the network device and based on the request, that the content is not stored in a memory associated with the network device;
identifying, by the network device, one or more requests, for the content, received from one or more other user devices based on determining that the content is not stored in the memory associated with the network device;
determining, by the network device, whether a quantity of requests, associated with the one or more requests, is greater than a threshold;
obtaining, by the network device and from a different device, one or more copies of the content when the quantity of requests is greater than the threshold,
the one or more copies of the content conforming to one or more formats that are supported by the one or more other user devices;
storing, by the network device and in the memory associated with the network device, the one or more copies of the content when the quantity of requests is greater than the threshold; and
causing, by the network device, a copy, of the one or more copies of the content, to be transmitted to the user device,
the copy conforming to a format, of the one or more formats, that is supported by the user device.

2. The method of claim 1, further comprising:
receiving, by the network device and from one of the one or more other user devices, another request for the content;
retrieving, by the network device and from the memory associated with the network device, another copy, of the one or more copies of the content, that conforms to another format of the one or more formats,
the other format being supported by the one of the one or more other user devices; and
causing, by the network device, the other copy to be transmitted to the one of the one or more other user devices.

3. The method of claim 1, where the format corresponds to at least one of:
a traffic rate that is supported by the user device,
the traffic rate corresponding to a data rate, a bandwidth utilization rate, or a frame rate,
a level of resolution that is supported by the user device,
screen dimensions associated with the user device, or
a compression ratio supported by the user device.

4. The method of claim 1, further comprising:
identifying a type of user device to which the user device corresponds;
determining that the copy is supported by the identified type of user device; and
causing the copy to be transmitted based on determining that the copy is supported by the identified type of user device.

5. The method of claim 1, further comprising:
identifying a first network device and a second network device via which the request for the content and the one or more requests are received;
identifying a first quantity of requests that are received via the first network device,
the first quantity of requests being based on the request and a portion of the one or more requests that are received via the first network device;
identifying a second quantity of requests that are received via the second network device,
the second quantity of requests being based on another portion of the one or more requests that are received via the second network device;

determining that the first quantity of requests is greater than a particular threshold and that the second quantity of requests is not greater than the particular threshold; and transmitting the one or more copies of the content to the first network device based on determining that the first quantity of requests is greater than the particular threshold, the one or more copies being transmitted for storage in a memory associated with the first network device.

6. The method of claim 1, further comprising:
receiving, from the different device, an instruction to store particular content;
receiving, from the different device, one or more copies of the particular content; and
storing, in the memory associated with the network device, the one or more copies of the particular content based on the instruction.

7. The method of claim 6, further comprising:
receiving, from the user device, a request for the particular content;
selecting a particular copy, of the one or more copies of the particular content, that is supported by the user device; and
causing the particular copy to be transmitted to the user device.

8. The method of claim 1, further comprising:
determining a quality of service (QoS) level associated with the user device; and
causing the copy to be transmitted, to the user device, in a manner that conforms to the QoS level.

9. A device, comprising:
a memory; and
one or more processors to:
receive, from a user device and via a network device, a request for content,
identify one or more other requests, for the content, that have been received via the network device,
determine whether a quantity of requests, associated with the request for the content and the one or more other requests, is greater than a threshold,
generate copies of the content when the quantity of requests is greater than the threshold,
the copies of the content conforming to formats that are supported by different types of user devices, and transmit, to the network device, the copies of the content,
the copies of the content being transmitted to the network device to:
cause the network device to store the copies of the content in a memory associated with the network device when the quantity of requests is greater than the threshold, and
cause the network device to distribute, to the user device, one of the copies of the content that conforms to one of the formats that is supported by the user device when the quantity of requests is greater than the threshold.

10. The device of claim 9, where the one or more processors are further to:
determine that the quantity of requests is not greater than the threshold,
generate a copy of the content that conforms to the one of the formats that is supported by the user device, and
transmit, via the network device, the copy of the content to the user device.

11. The device of claim 10, where the one or more processors are further to:
obtain, from the request for content, information associated with the user device,
identify, based on the information associated with the user device, a type of user device, of the different types of user devices, to which the user device corresponds,
identify the one of the formats that corresponds to the type of user device, and
generate the copy of the content in a manner that conforms to the one of the formats.

12. The device of claim 9, where, when generating the copies of the content, the one or more processors are further to:
transcode the copies of the content to conform to at least one of:
a set of data rates, bandwidth utilization rates, or frame rates that are supported by the different types of user devices,
a set of compression ratios that are supported by the different types of user devices,
a set of resolution levels that are supported by the different types of user devices, or
a set of screen dimensions associated with the different types of user devices.

13. The device of claim 9, where the one or more processors are further to:
determine whether the content is stored in a memory associated with the device,
obtain, from a content provider, the content when the content is not stored in the memory, and
store the content in the memory associated with the device based on a determination that the quantity of requests is greater than another threshold.

14. The device of claim 13, where the one or more processors are further to:
receive another request for the content, and
transmit, based on the other request, the content without communicating with the content provider.

15. A device, comprising:
one or more memories; and
one or more processors to:
receive, from a user device and via a first network device, a first request for content,
determine, based on the first request, whether the content is stored in a memory associated with the device,
obtain, from the memory associated with the device and when the content is stored in the memory associated with the device, information that identifies:
a first plurality of requests, for the content, received via the first network device over a time period, and
a second plurality of requests, for the content, received via a second network device over the time period,
identify a first quantity associated with the first plurality of requests and a second quantity associated with the second plurality of requests,
determine whether the first quantity is greater than a first threshold,
transmit the content, to the user device and via the first network device, when the first quantity is not greater than the first threshold,
determine whether the second quantity is greater than a second threshold, and
transmit, to the second network device, the content and an instruction to store the content when the second quantity is greater than the second threshold.

16. The device of claim 15, where the one or more processors are further to:
- identify a quantity of requests, for the content, received over the time period when the content is not stored in the memory,
- obtain, from a different device, a copy of the content that conforms to a format that is supported by the user device when the quantity of requests, for the content, is not greater than a different threshold,
- obtain, from the different device, copies of the content when the quantity of requests, for the content, is greater than the different threshold,
  - the copies of the content conforming to formats that are supported by different types of user devices,
- store, in the memory associated with the device, the copies of the content when the quantity of requests, for the content, is greater than the different threshold, and
- transmit, to the user device, the copy of the content or one of the copies of the content that is supported by the user device.

17. The device of claim 15, where the one or more processors are further to:
- obtain the content, from another device, when the content is not stored within the memory,
- identify a quantity of requests, for the content, received over the time period,
- transcode the content to conform to a format that is supported by the user device when the identified quantity of requests is not greater than a different threshold,
- generate copies of the content when the identified quantity of requests is greater than the different threshold,
  - the copies of the content conforming to formats that are supported by different types of user devices,
- store, in the memory associated with the device, copies of the content when the identified quantity of requests is greater than the different threshold, and
- transmit, to the user device, the transcoded content that conforms to the format or one of the copies of the content that conforms to the format.

18. The device of claim 17, where the one or more processors are further to:
- receive, from another user device, another request for the content,
- retrieve, from the memory associated with the device, another one of the copies of the content, that conforms to a format that is supported by the other user device, and
- transmit the other one of the copies of the content to the other user device.

19. The device of claim 18, where the one or more processors are further to:
- obtain information associated with the other user device,
- identify a level of quality of service (QoS) associated with the other user device based on the information associated with the other user device, and
- transmit the other one of the copies of the content, to the other user device, in a manner that conforms to the identified level of QoS.

20. The device of claim 15, where the one or more processors are further to:
- determine that the first quantity is not greater than the first threshold,
- transcode the content to conform to a format that is supported by the user device based on determining that the first quantity is not greater than the threshold, and
- where, when transmitting the content to the user device, the one or more processors are to:
- transmit the transcoded content to the user device via the first network device.

21. The device of claim 15, where the one or more processors are further to:
- determine that the second quantity is greater than the second threshold,
- generate copies of the content that conform to formats that are supported by different types of user devices based on determining that the second quantity is greater than the second threshold, and
- where, when transmitting the content and the instruction, the one or more processors are to:
- transmit, to the second network device, the instruction to store the content, the instruction including the copies of the content that conform to the formats.

* * * * *